(12) United States Patent
Krasinskiy et al.

(10) Patent No.: US 8,219,650 B2
(45) Date of Patent: Jul. 10, 2012

(54) COMMUNICATING WITH A STATUS MANAGEMENT COMPONENT IN A COMPUTER SYSTEM

(75) Inventors: Alexander Krasinskiy, Sandhausen (DE); Renzo Colle, Stutensee (DE); Henrik Saterdag, Weinheim (DE); Daniel Zoch, Walldorf (DE)

(73) Assignee: SAP AG, Walldorf (DE)

( * ) Notice: Subject to any disclaimer, the term of this patent is extended or adjusted under 35 U.S.C. 154(b) by 1080 days.

(21) Appl. No.: 11/617,462

(22) Filed: Dec. 28, 2006

(65) Prior Publication Data

US 2008/0162672 A1 Jul. 3, 2008

(51) Int. Cl.
*G06F 15/16* (2006.01)
*G06F 15/177* (2006.01)
*G06F 15/173* (2006.01)
*G06F 9/44* (2006.01)
*G06F 9/46* (2006.01)

(52) U.S. Cl. ........ 709/220; 709/201; 709/202; 709/205; 709/223; 709/234; 717/101; 717/104; 717/106; 718/101; 718/106

(58) Field of Classification Search .................. 709/201, 709/202, 205, 220, 223, 234
See application file for complete search history.

(56) References Cited

U.S. PATENT DOCUMENTS

| | | | |
|---|---|---|---|
| 5,212,792 A | 5/1993 | Gerety et al. | |
| 5,295,222 A | 3/1994 | Wadhwa et al. | |
| 5,404,496 A | 4/1995 | Burroughs et al. | |
| 5,652,714 A | 7/1997 | Peterson et al. | |
| 5,758,029 A | 5/1998 | Hall | |
| 5,781,545 A | 7/1998 | Matthew | |
| 5,890,146 A | 3/1999 | Wavish et al. | |
| 5,920,718 A | 7/1999 | Uczekaj et al. | |
| 5,983,016 A * | 11/1999 | Brodsky et al. | 717/104 |
| 5,991,733 A * | 11/1999 | Aleia et al. | 705/8 |
| 6,078,325 A * | 6/2000 | Jolissaint et al. | 715/839 |

(Continued)

FOREIGN PATENT DOCUMENTS

EP 1 674 990 6/2006

(Continued)

OTHER PUBLICATIONS

Leavens, Gary T. et al., "Preliminary Design of JML: A Behavioral Interface Specification Language of Java," ACM SIGSOFT Software Engineering Notes, vol. 31, No. 3, May 2006, pp. 1-38.

(Continued)

*Primary Examiner* — Ranodhi Serrao
*Assistant Examiner* — Farrukh Hussain
(74) *Attorney, Agent, or Firm* — Fish & Richardson P.C.

(57) ABSTRACT

Communication with a status management component of a computer system is enabled. A status adapter is provided to a processing runtime environment for use in accessing a status management runtime environment. The processing runtime environment includes data object node instances resident in computer memory and enables access to persistent storage for data object node instances. The status management runtime environment is configured to provide status-related information. The status adapter is configured to 1) accept input from the processing runtime environment, 2) provide, to the status management runtime environment, the input in a form that the status management runtime environment is able to use, 3) receive, from the status management runtime environment, an output including status-related information, and 4) provide, to the processing runtime environment, the output in a form that the processing runtime environment is able to use.

8 Claims, 11 Drawing Sheets

U.S. PATENT DOCUMENTS

| | | | |
|---|---|---|---|
| 6,151,023 A * | 11/2000 | Chari | 715/854 |
| 6,175,837 B1 | 1/2001 | Sharma et al. | |
| 6,182,277 B1 | 1/2001 | DeGroot | |
| 6,308,224 B1 | 10/2001 | Leymann et al. | |
| 6,324,496 B1 | 11/2001 | Alur et al. | |
| 6,408,262 B1 | 6/2002 | Leerberg et al. | |
| 6,442,515 B1 | 8/2002 | Varma et al. | |
| 6,480,955 B1 * | 11/2002 | DeKoning et al. | 713/100 |
| 6,553,403 B1 * | 4/2003 | Jarriel et al. | 709/202 |
| 6,681,383 B1 | 1/2004 | Pastor et al. | |
| 6,769,048 B2 | 7/2004 | Goldberg et al. | |
| 6,772,036 B2 | 8/2004 | Eryurek et al. | |
| 7,120,896 B2 | 10/2006 | Budhiraja et al. | |
| 7,191,149 B1 | 3/2007 | Lanham et al. | |
| 7,451,447 B1 | 11/2008 | Deshpande | |
| 7,606,791 B2 | 10/2009 | Dettinger et al. | |
| 7,613,993 B1 | 11/2009 | Baer et al. | |
| 7,761,337 B2 | 7/2010 | Caballero et al. | |
| 2002/0013777 A1 | 1/2002 | Diener | |
| 2002/0038206 A1 | 3/2002 | Dori | |
| 2002/0062475 A1 | 5/2002 | Iborra et al. | |
| 2002/0083413 A1 | 6/2002 | Kodosky et al. | |
| 2002/0138290 A1 | 9/2002 | Metcalfe et al. | |
| 2002/0152102 A1 | 10/2002 | Brodersen et al. | |
| 2002/0167544 A1 | 11/2002 | Raghavan et al. | |
| 2002/0194388 A1 | 12/2002 | Boloker et al. | |
| 2003/0018461 A1 | 1/2003 | Beer et al. | |
| 2003/0028858 A1 | 2/2003 | Hines | |
| 2003/0046658 A1 | 3/2003 | Raghaven et al. | |
| 2003/0195789 A1 * | 10/2003 | Yen | 705/9 |
| 2004/0027388 A1 | 2/2004 | Berg et al. | |
| 2004/0049436 A1 | 3/2004 | Brand et al. | |
| 2004/0059808 A1 | 3/2004 | Galloway et al. | |
| 2004/0078258 A1 | 4/2004 | Schulz et al. | |
| 2004/0083448 A1 | 4/2004 | Schulz et al. | |
| 2004/0181775 A1 | 9/2004 | Anonsen et al. | |
| 2004/0193510 A1 | 9/2004 | Catahan, Jr. et al. | |
| 2004/0225919 A1 | 11/2004 | Reissman et al. | |
| 2004/0233232 A1 | 11/2004 | Iborra et al. | |
| 2005/0004888 A1 | 1/2005 | McCrady et al. | |
| 2005/0004951 A1 | 1/2005 | Ciaramitaro et al. | |
| 2005/0137928 A1 | 6/2005 | Scholl et al. | |
| 2006/0085681 A1 | 4/2006 | Feldstein et al. | |
| 2006/0095439 A1 | 5/2006 | Buchmann et al. | |
| 2006/0136923 A1 | 6/2006 | Kahn et al. | |
| 2006/0179383 A1 | 8/2006 | Blass et al. | |
| 2006/0227350 A1 | 10/2006 | Crawford et al. | |
| 2006/0265691 A1 | 11/2006 | Klinger et al. | |
| 2006/0294158 A1 | 12/2006 | Tsyganskiy et al. | |
| 2007/0142935 A1 | 6/2007 | Danielsson et al. | |
| 2007/0156427 A1 | 7/2007 | Dentzer et al. | |
| 2007/0226025 A1 | 9/2007 | Chang et al. | |
| 2008/0005061 A1 | 1/2008 | Kraft | |
| 2008/0005152 A1 | 1/2008 | Kraft | |
| 2008/0005153 A1 | 1/2008 | Kraft | |
| 2008/0005162 A1 | 1/2008 | Kraft et al. | |
| 2008/0005625 A1 | 1/2008 | Kraft | |
| 2008/0005739 A1 | 1/2008 | Sadiq | |
| 2008/0005743 A1 | 1/2008 | Kraft | |
| 2008/0005747 A1 | 1/2008 | Meyer et al. | |
| 2008/0015883 A1 | 1/2008 | Hermann | |
| 2008/0046862 A1 | 2/2008 | Sattler et al. | |
| 2009/0089309 A1 | 4/2009 | Thimmel | |

FOREIGN PATENT DOCUMENTS

WO    WO 2005/117549 A3    12/2005

OTHER PUBLICATIONS

Kiczales, Gregor et al., "An Overview of AspectJ," Lecture notes in Computer Science, Springer Verlag, Berlin, Germany, vol. 2072, Jun. 18, 2001, pp. 327-353.

International Search Report and Written Opinion of the International Searching Authority issued on Nov. 30, 2007, in corresponding application PCT/EP2007/005785.

'Unified Modeling Language: Superstructure Version 2.0' [online]. Object Management Group, 2005, [retrieved on Nov. 27, 2006]. Retrieved from the Internet: <URL: www.omg.org/docs/formal/05-07-04.pdf>, pp. 8-12.

'Status Management' [online]. SAP, [retrieved on Nov. 27, 2006]. Retrieved from the Internet: <URL: help.sap.com/saphelp_47x200/helpdata/en/ee/41f79346ee11d189470000e829fbbd/content.htm>, 2 pages.

Status Management [online]. SAP, [retrieved on Nov. 27, 2006]. Retrieved from the Internet: <URL: help.sap.com/saphelp_47x200/helpdata/en/f0/ca3965260211d28a430000e829fbbd/content.htm>, 1 page.

'User Status' [online]. SAP, [retrieved on Nov. 27, 2006]. Retrieved from the Internet: <URL: help.sap.com/saphelp_47x200/helpdata/en/f0/ca39a6260211d28a430000e829fbbd/content.htm>, 1 page.

'Workflow Management Coalition the Workflow Reference Model' [online]. Workflow Management Coalition, 1995, [retrieved on Nov. 27, 2006]. Retrieved from the Internet: <URL: www.wfmc.org/standards/docs/tc003v11.pdf>, 55 pages.

'Introduction to OMG's Unified Modeling Language™ (UML®)' [online]. Object Management Group, 2005 [retrieved on Nov. 26, 2006]. Retrieved from the Internet: <URL: omg.org/gettingstarted/what_is_uml.htm>, 16 pages.

Jason Zhicheng Li, "Business Object State Management Using State Machine Compiler," Internet Citation, May 1, 2006 (May 2, 2006), XP002396380, Retrieved from the internet: http://today.java.ne/pub/a/today/2006 /01/05/business-object-state management-using-smc. html, retrieved Aug. 24, 2006.

Eric Armstrong, "How to implement state-dependent behavior—Doing the State pattern in Java," internet citation, XP002246628 ISSN: 1091-8906, Retrieved from the internet: http://222.javaworld.com/javaworld/jw-08-1997/jw-08-stated_p.html, retrieved on Jul. 7, 2003.

W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.

Lohman et al., "Behavioral Contraints for Services", Business Process Management, 5th International Conference, BPM, 2007, Brisbane, Australia.

Holger Giese, "Object-Oriented Design and Architecture of Distributed Systems", Inaugural-Dissertation, Department of Mathematics and Computer Science, Faculty of Mathematics and Natural Science, Westfälischen Wilhelms-Universität Münster, for the degree of Doctor of Science, Feb. 2001.

Beugnard et al., "Making Components Contract Aware", IEEE Computer Society, Jul. 1999, pp. 38-45.

Wirtz et al., "The OCoN Approach to Workflow Modeling in Object-Oriented Systems", Information Systems Frontiers 3:3, 357-376, 2001.

"Unified Modeling Language: Superstructure", Version 2.0, formal/Jul. 4, 2005, Object Management Group, Aug. 2005.

"Unified Modeling Language: Infrastructure", Version 2.1.1 (without change bars), formal/Jul. 2, 2006, Object Management Group, Feb. 2007.

"Unified Modeling Language: Superstructure", Version 2.1.1 (non-change bar), formal/Jul. 2, 2005, Object Management Group, Feb. 2007.

"Object Constraint Language", OMG Available Specification, Version 2.0, formal/Jun. 5, 2001, Object Management Group, May 2006.

Baldan et al., "Functorial Concurrent Semantics for Petri Nets and Read and Inhibitor Arcs", Lecture Notes in Computer Science, vol. 1877, Proceedings of the 11th International Conference on Concurrency Theory, Springer-Verlag, 2000.

"Business Process Modeling Notation Specification", Final Adopted Specification, dtc/Jun. 2, 2001, Object Management Group, Feb. 2006.

S. Christensen and N. Hansen, "Coloured Petri Nets Extended with Place Capacities, Test Arcs and Inhibitor Arcs", Lecture Notes in Computer Science, vol. 691, Proceedings of the 14th International Conference on Application and Theory of Petri Nets, Springer-Verlag, 1993.

S. Stelting et al., "Applied Java Patterns" (Online), Dec. 26, 2001, Prentice Hall, retrieved from the internet: http://proquest.safaribooksonline.com/0130935387?tocview=true>, retrieved Aug. 7, 2009).

International Search Report and Written Opinion of the International Searching Authority issued in PCT/EP2007/005783 on Jan. 7, 2009.

International Search Report and Written Opinion of the International Searching Authority issued in PCT/EP2007/005779 on Dec. 30, 2008.

International Search Report and Written Opinion of the International Searching Authority issued in PCT/EP2007/005782 on Dec. 30, 2008.

International Search Report and Written Opinion of the International Searching Authority issued in PCT/EP2007/005786 on Jan. 8, 2009.

International Search Report and Written Opinion of the International Searching Authority issued in PCT/EP2007/005784 on Dec. 29, 2008.

International Search Report and Written Opinion of the International Searching Authority issued in PCT/EP2007/005781 on Dec. 30, 2008.

Extended European Search Report issued in 07025131.9-1243 / 1939744 on Aug. 19, 2009.

Non-Final Office Action issued in U.S. Appl. No. 11/862,813 on Nov. 25, 2009.

Kraft et al., U.S. Appl. No. 12/102,548, filed Apr. 14, 2008.

Thimmel et al., U.S. Appl. No. 12/020,984, filed Jan. 28, 2008.

Kraft et al., U.S. Appl. No. 12/634,834, filed Dec. 10, 2009.

Kraft et al., U.S. Appl. No. 12/634,996, filed Dec. 10, 2009.

Non-Final Office Action issued in U.S. Appl. No. 11/477,787 on Dec. 29, 2009.

Non-Final Office Action issued in U.S. Appl. No. 11/617,580 on Dec. 30, 2009.

Final office action from U.S. Appl. No. 11/477,787 dated Jun. 24, 2010, 18 pages.

Merriam-Webster Online, "Programmatically—Definition and More from the Free Merriam Webster" downloaded Jun. 16, 2010, http://www.merriam-webster.com/dictionary/programmatically.

Office action from U.S. Appl. No. 11/617,577 dated Mar. 25, 2010, 21 pages.

Office action from U.S. Appl. No. 11/617,495 dated Mar. 18, 2010, 17 pages.

Final Office Action from U.S. Appl. No. 11/617,580 dated Jun. 24, 2010, 13 pages.

Office action from U.S. Appl. No. 11/617,616 dated Apr. 19, 2010, 15 pages.

Final Office Action from U.S. Appl. No. 11/862,813 dated Jun. 11, 2010, 7 pages.

Office action from U.S. Appl. No. 12/020,984 dated Apr. 12, 2010, 10 pages.

Final office action from U.S. Appl. No. 11/617,577, dated Aug. 25, 2010, 21 pages.

Final office action from U.S. Appl. No. 11/617,495, dated Aug. 25, 2010, 16 pages.

Office action from U.S. Appl. No. 11/617,464, dated Sep. 3, 2010, 14 pages.

Final office action from U.S. Appl. No. 12/020,984, dated Sep. 30, 2010, 17 pages.

Office action from U.S. Appl. No. 11/617,647, dated Nov. 5, 2010, 26 pages.

Office action from U.S. Appl. No. 11/617,638, dated Sep. 30, 2010, 16 pages.

Office action from U.S. Appl. No. 11/617,464, dated Feb. 28, 2011, 14 pages.

Final office action from U.S. Appl. No. 11/617,647, dated Jul. 11, 2011, 26 pages.

Office action from U.S. Appl. No. 12/333,197. dated Oct. 14, 2011, 14 pages.

Office action from U.S. Appl. No. 12/634,834, dated Oct. 12, 2011, 17 pages.

Office action from U.S. Appl. No. 12/634,996, dated Sep. 8, 2011, 14 pages.

Office action from U.S. Appl. No. 11/617,580, dated Dec. 8, 2011, 37 pages.

Final office action from U.S. Appl. No. 12/634,996, dated Jan. 4, 1012, 9 pages.

Office action from U.S. Appl. No. 12/102,548, dated Jan. 12, 2012, 21 pages.

* cited by examiner

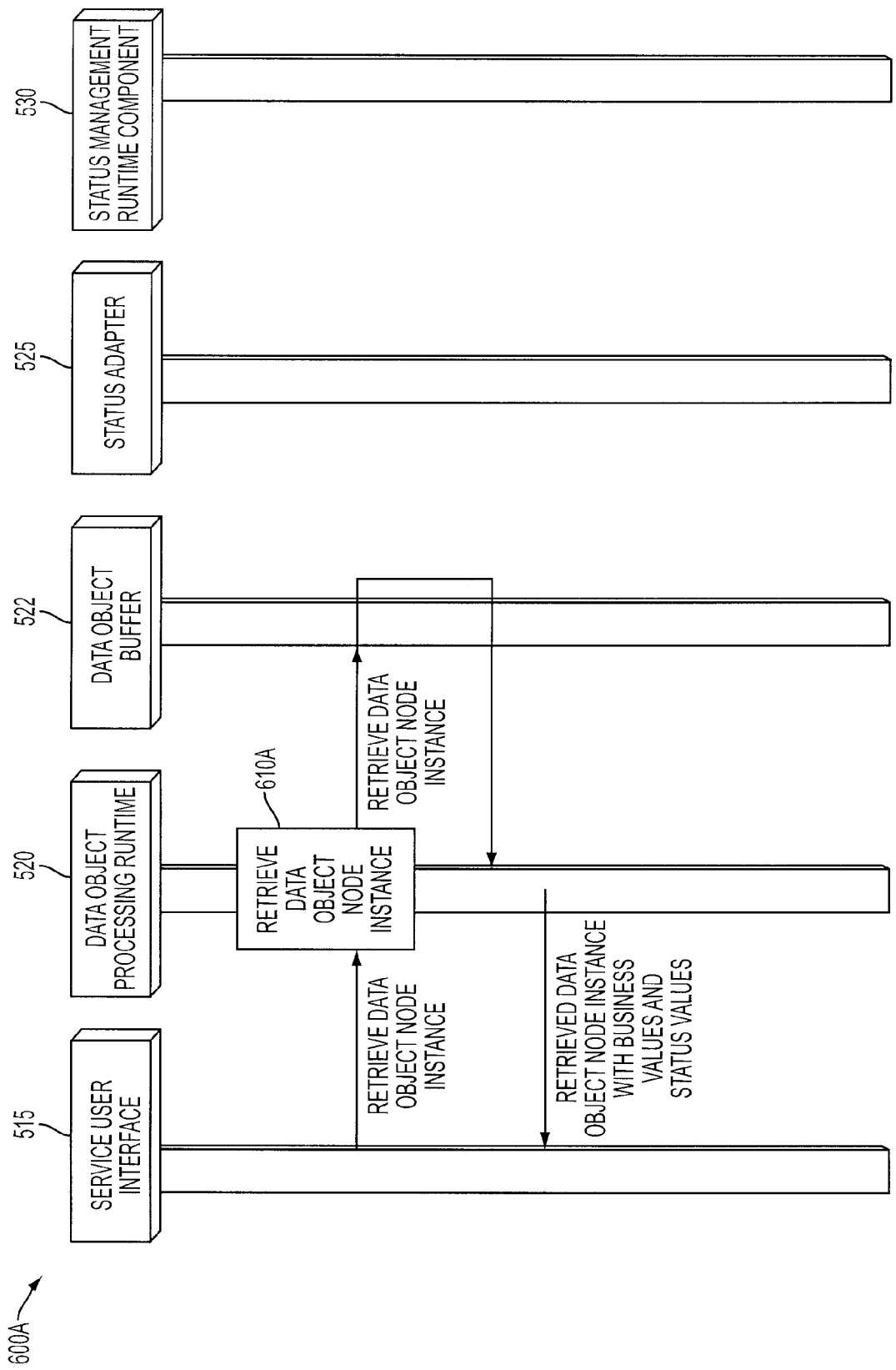

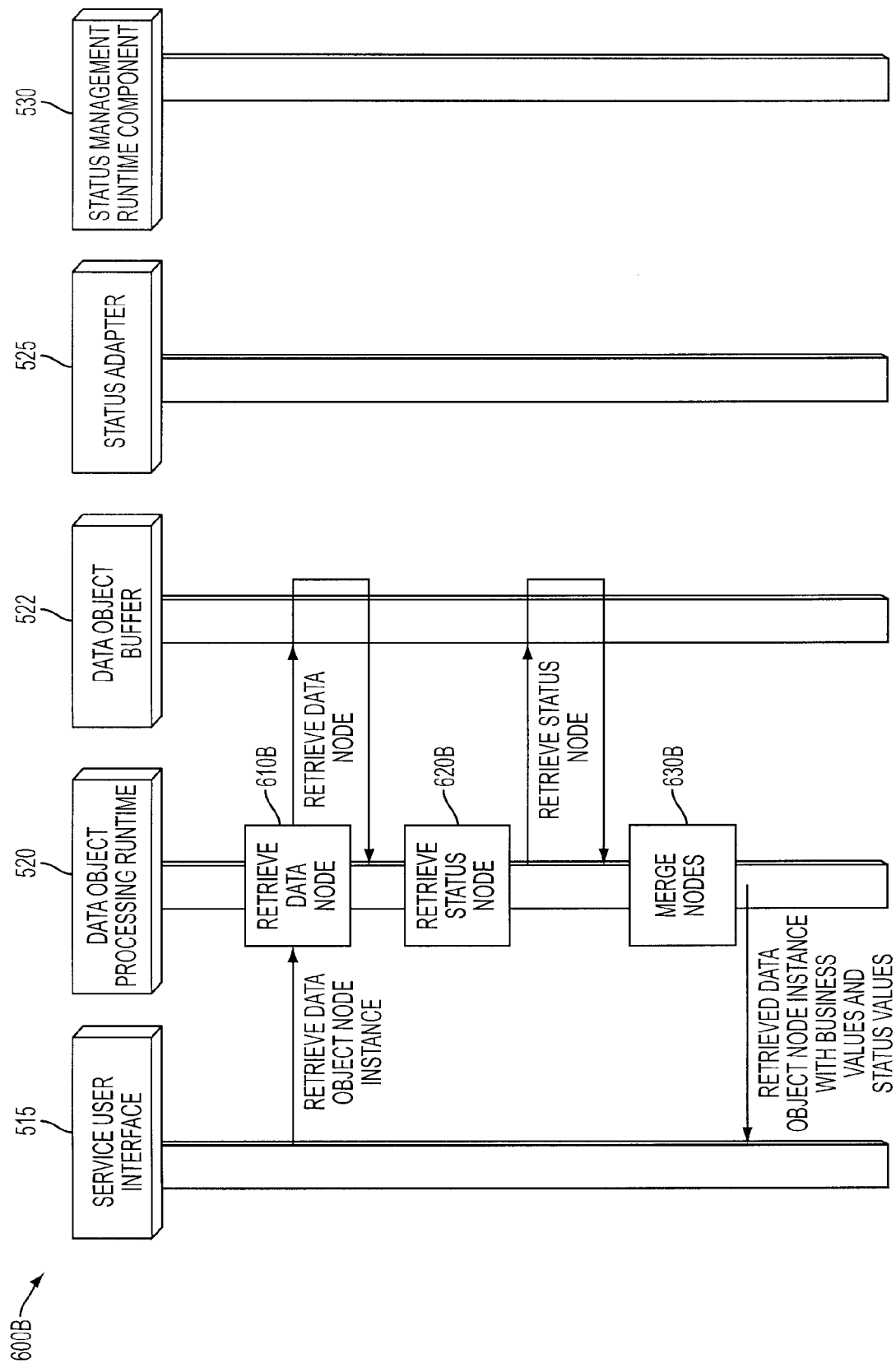

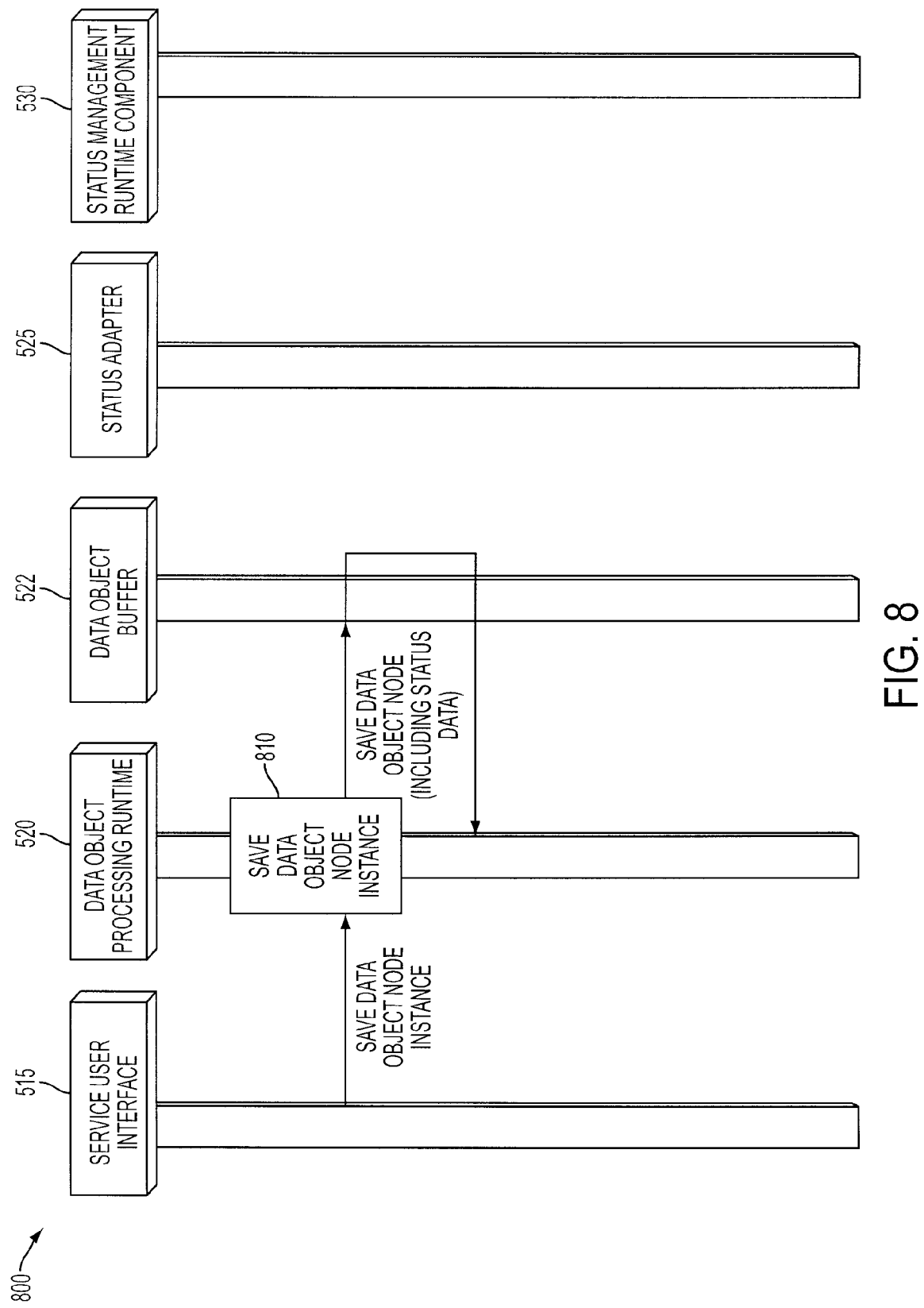

COMMUNICATING WITH A STATUS MANAGEMENT COMPONENT IN A COMPUTER SYSTEM

TECHNICAL FIELD

This description relates to techniques for communicating with a status management component in a computer system.

BACKGROUND

A business enterprise may use various programs running on one or more computer systems to manage and process business data. Computer systems may be used for processing business transactions, such as taking and fulfilling customer orders, providing supply chain and inventory management, performing human resource management functions, and performing financial management functions. Computer systems also may be used for analyzing data, including analyzing data obtained through transaction processing systems.

Software systems and components using object technology may be developed for computer systems. The operations of these systems and components may occur through execution of actions that are performed on and/or by data objects. A data object's state may be said to include the combination of current attribute values of the object at a particular point in time. The execution of an action may change attribute values of an object, which, in turn, may lead to a new state of the object. Sometimes the current state of the object or computing environment may be an important factor in determining whether a particular action is allowed to be performed or not.

SUMMARY

In one general aspect, communication with a status management component of a computer system is enabled. A status adapter is provided to a processing runtime environment for use in accessing a status management runtime environment. The processing runtime environment includes data object node instances resident in computer memory and enables access to persistent storage for data object node instances. Each data object node instance includes values for variables and actions capable of being performed by the data object node instance. The status management runtime environment is configured to provide status-related information. The status adapter is configured to 1) accept input from the processing runtime environment, 2) provide, to the status management runtime environment, the input in a form that the status management runtime environment is able to use, 3) receive, from the status management runtime environment, an output including status-related information, and 4) provide, to the processing runtime environment, the output in a form that the processing runtime environment is able to use.

Implementations may include one or more of the following features. For example, the output may include initial status values for variables of a data object node instance. The status management runtime environment may determine whether a particular action is allowed to be performed by a data object node instance. The determination may be based on a status value of the data object node instance. The output may include an indication whether the particular action is allowed to be performed by the data object node instance.

The input may include a status value for a status variable of the data object node instance. The status value may be used to determine whether the particular action is allowed to be performed by the data object node instance. The output may include a status value for a status variable to be set in the data object node instance.

The output may include a set of status values. The set of status values may include a first status value for a status variable to be set in the data object node instance and a second status value for a status variable to be set in a second data object node instance. The second data object node instance may be a child node of the data object node instance.

The status adapter may transform a status value received from the processing runtime environment to a status value usable by the status management runtime environment and may transform a status value received from the status management runtime environment to a corresponding status value usable by the processing runtime environment. The status adapter may transform an indication of an action received from the status management runtime environment to an indication of a corresponding action usable by the processing runtime environment and may transform a user-defined status value received from the status management runtime environment to a corresponding status value usable by the processing runtime environment.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

FIGS. 3 and 5, 6A, 6B, 7A, 7B and 8 are flow charts of processes for facilitating communications between a data object processing framework and a status management component in a computer system.

Like reference symbols in the various drawings indicate like elements.

DETAILED DESCRIPTION

Techniques are described for facilitating communications between a data object processing framework and a status management component in computer systems. There are various ways of implementing objects in software applications. The term "object node" is used in this description to refer to either an overall object or particular elements of an object (e.g., particular actions and/or attributes associated with the object). When an object node is used in a business software application, the object node may be referred to as a business object node or an application object node. The term "data object node" also may be used to refer to an object node. A data object node may refer to a business object node, for example, that includes variables and actions related to a business entity, such as a document (e.g., a sales order, a purchase order or an invoice), an organization (e.g., such as a business partner, supplier or customer) or a person (e.g., such as an employee or a customer). A data object node also may refer to a processing object node, such as an object node that processing information for an entity being processed in a workflow.

Figure 1:
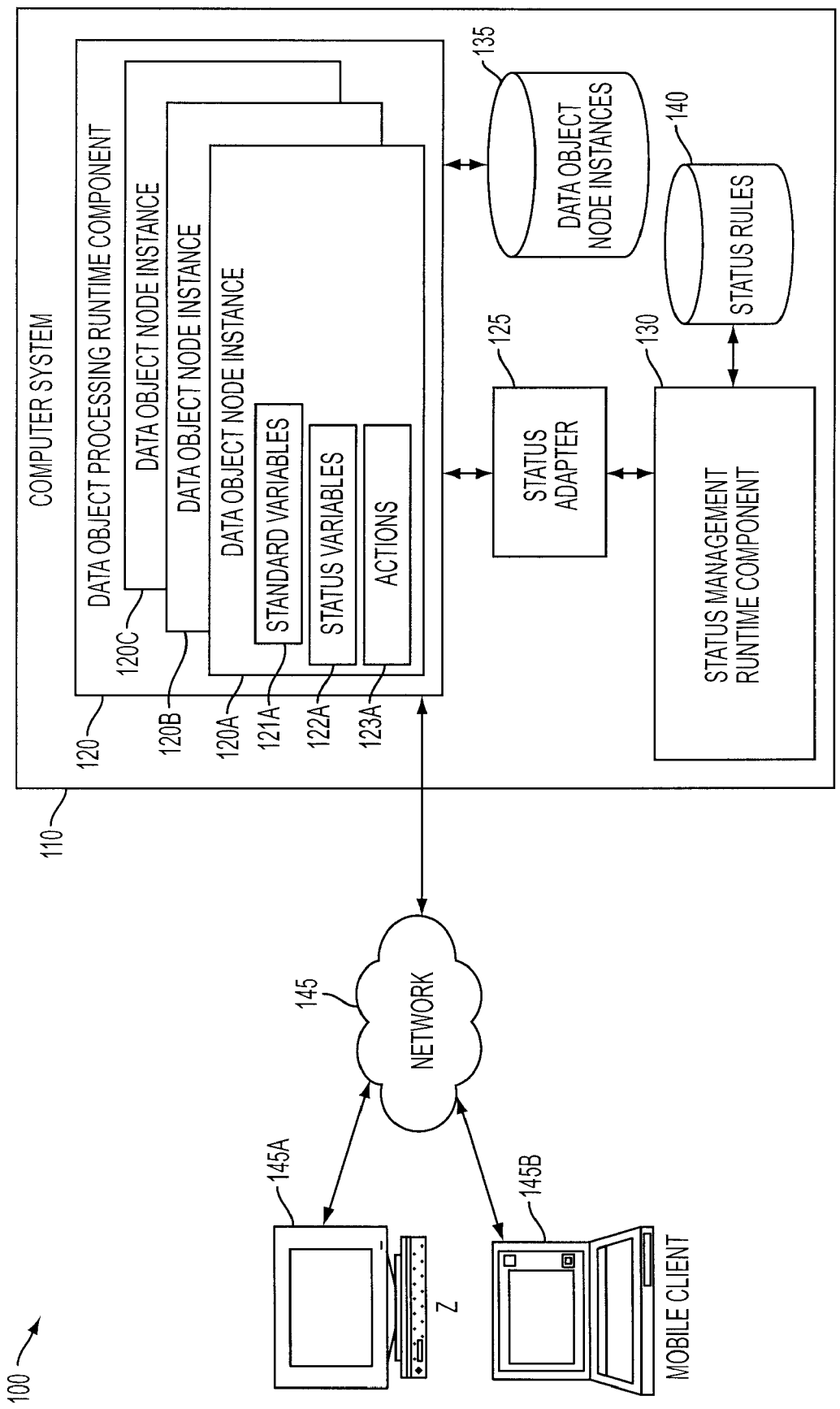
FIGS. 1 and 4 are block diagrams of computer systems that enable communication between a data object processing framework and a status management component.

FIG. 1 shows a system 100 of networked computers that facilitate communications between a data object processing framework and a status management component in computer systems. In general, the system 100 uses a status management runtime component to determine whether an action is permitted to be performed by a data object node instance, and a status adapter computing component enables communication between the data object processing framework for the data object node and the status management runtime component.

More particularly, the system 100 of networked computers includes a computer system 110 having a data object processing runtime component 120, a status adapter 125 and a status management runtime component 130. The computer system 110 also includes persistent storage 135 for data object node instances and persistent storage 140 for status rules. The computer system 110 may be a general-purpose computer or a special-purpose computer.

The data object processing runtime component 120 includes various data object node instances 120A-120C that may be persistently stored in storage 135. More particularly, each of the object node instances 120A, 120B and 120C is a collection of data variables and actions that may be performed by the data object node instance. In this example, each instance 120A-120C has standard variables, each of which corresponds to a characteristic or attribute of the object node instance. For example, a sales order object node instance 120A may include, for example, standard variables identifying a customer to whom the sale was made and the date of the sale. Each instance 120A-120C also has one or more status variables. A status variable indicates a status of the data object node instance. For example, a status variable may indicate the status of a data object node instance relative to a stage of processing. In a more particular example, a status variable may indicate whether a sales order object node instance (representing a real-world sales order) has been approved. Each instance 120A-120C also has actions that may be executed by the object node instance. An action may correspond to a method that may be performed by or on an object node instance. As shown, the data object node instance 120A has standard variables 121A, status variables 122A and actions 123A. The data object node instances 120B and 120C also have standard variables, status variables and actions (not shown). In some implementations, status variables for a data object node instance may be stored separately from other types of variables of the data object node instance.

As shown here, the data object node instances 120A, 120B and 120C each correspond to a principal entity represented in the computer system 110. Each of the example object node instances 120A-120C relate to a document used in a business process—here, respectively, the instances correspond to documents used in the business process of delivering and invoicing merchandise sold to a customer. Another example of a data object node instance include information about a customer, a employee, a product, and a business partner (such as a supplier). A data object node instance may be stored as one or more rows in a relational database table (or tables), a persistent object instance in an object-oriented database, data in one or more extensible mark-up language (XML) files, or one or more records in a data file.

In some implementations, an object node instance may be related to other object node instances. In one example, a sales order may include multiple sales order nodes, such as a root node identifying information that applies to the sales order (such as information that identifies the customer and the date the sales order was placed) and one or more item nodes identifying information related to each type of item ordered (such as an item number, quantity ordered, price of each item and cost of items ordered). In another example, multiple data object node instances may relate to a particular sale of merchandise to a customer. More particularly, for example, a sales order object node instance, a delivery object node and invoice object node instance each may relate to the same sale of merchandise to a particular customer. As such, each of object node instances may be said to relate to one another.

Figure 2:
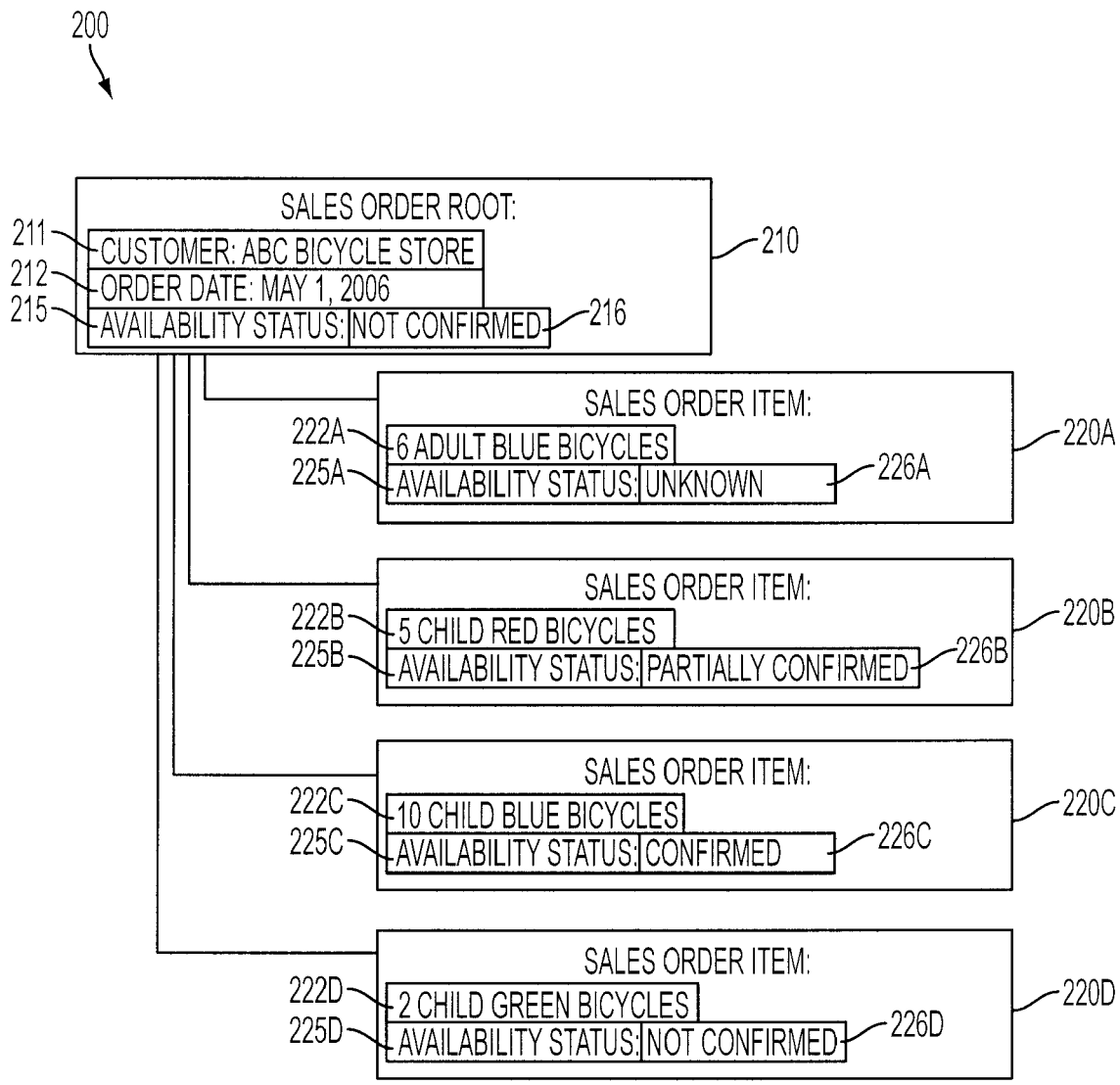
FIG. 2 is a block diagram of runtime sales order nodes instances.

FIG. 2 illustrates an example of runtime sales order node instances 200, which collectively represent a sales order by a customer (i.e., "ABC Bicycle Store") for products (i.e., bicycles). In this example, a sales order root instance 210 is related to sales order item instances 220A-220D. The sales order root instance 210 may be referred to as the parent node of each of the sales order item instances 220A-220D. In turn, each of the sales order item instances 220A-220D may be said to be a child node of the sales order root instance 210. Each of the sales order item instances 220A-220D also may be referred to as a sibling node of the other sales order item instances 220A-220D.

More particularly, the sales order root instance 210 has a customer 211 variable with a value "ABC Bicycle Store" and an order date 212 variable with a value of "May 1, 2006." Each variable 211 and 212 may be referred to as a standard variable or characteristic of the sales order root. The sales order root 210 has an availability status variable 215 having a value 216 of NOT CONFIRMED. As described more fully later, the availability status value of 216 is a reflection of the available status values of the sales order item instances 220A-220D. For example, a process (which may be referred to as an aggregation derivation) determines an appropriate status value of a status variable for a parent data object node based on status values of the corresponding status variable in one or more child data object nodes. Another type of status value update across data object nodes is a population derivation "pushes" or copies a status value of a status variable from a parent data object node to corresponding status variables in one or more child data object nodes of the parent data object node.

Each of the sales order item instances 220A-220D have a standard variable 222A-222D with a value describing a type of bicycle and a corresponding quantity purchased. For example, sales order item instance 220A has a standard variable 222A identifying "6 adult blue bicycles" as the type and quantity of a bicycle purchased.

Each of the sales order item instances 220A-220D also has an availability status variable 225A-225D having a value 226A-226D that identifies the availability status of the bicycles identified in the standard variable 225A-225D. For example, the sales order item 220A has an availability status value 226A of UNKNOWN for six adult blue bicycles; the sales order item 220B has an availability status value 226B of PARTIALLY CONFIRMED for five child red bicycles; the sales order item 220C has an availability status value 226C of CONFIRMED for ten child blue bicycles; and the sales order item 220D has an availability status value of NOT CONFIRMED for two child green bicycles.

Referring again to FIG. 1, the status management runtime component 130 receives status information associated with object node instances 120A-120C and makes determinations, on behalf of the object node instances, as to whether actions are allowed to be performed based at least in part on the status information associated with the object nodes.

When one of the object node instances 120A, 120B or 120C of the data object processing runtime component 120 receives a request to perform an action, the object node instance 120A, 120B or 120C sends a request to the status adapter 125, which, in turn, communicates with the status management runtime component 130 to determine whether the action is allowed to be performed.

Generally, the status adapter 125 transforms the request such that the request is able to be processed by the status management runtime component 130. For example, the status adapter 125 may transform object data in the request from a form able to be processed by the data object processing runtime component 120 to a form able to be processed by the status management runtime component 130.

One example of a transformation that may be performed by a status adapter is transforming (or converting or translating) object data in the request received by the data object processing runtime component 120 to a data in a different data structure that is used by the status management runtime component 130. The data object processing runtime component 120 may use a different data model than the status management runtime component 130, and, require data to be to a different data structure before the data can be accepted or used by the status management runtime component 130. To accomplish communication between data object processing runtime component 120 and the status management runtime component 130, data structures in each component may be mapped onto one another by the status adapter.

For example, data contents need to be matched appropriately. More particularly, status variable names may need to be matched. In one illustration, the data object processing runtime component 120 may include a status variable named "sales object approval," which corresponds to a status variable named "approval status" in the status management processing runtime component 130. In another example, the data object processing runtime component 120 may have an action named "sales order item approve," which corresponds to an action named "approve" in the status management processing runtime component 130. In yet another example, the data object processing runtime component 120 may store data values representing a particular attribute using a different field type and length as that used by the status management runtime component 130. The data object processing runtime component 120 may use different data codes than the status management runtime component 130. For example, the data object processing runtime component 120 may store an approval value using a numeric code (for example, a "1" for approved and a "2" for rejected), whereas the status management runtime component 130 may store an approval value as a textual abbreviation (for example, "approved" and "rejected"). The status value codes in each of the runtime components 120, 130 may be identified as representing the same attribute and then a translation table may be used by the status adapter to translates the various possible values from one system to another system (for example, "1" to "approved" and "2" to "rejected").

The status management runtime component 130 receives the request from the status adapter 125 and checks to determine whether the status information associated with the object node instance 120A, 120B or 120C permits the action to be performed. The status information associated with the object node instance may include one or more status variable values associated with the object node instance and one or more constraints identifying what actions may be allowed to be performed based at least in part on the one or more status variable values. The status information also may include one or more constraints identifying what status variable values may be allowed to be set following the performance of an action. The status information may include one or more constraints identifying what status variable values may be changed based on a change in one or more other status variable values. The status management runtime component 130 may access status rules in persistent storage 140 to make the determination.

When the outcome of the determination by the status management runtime component 130 specifies that the action is not allowed, the status management runtime component 130 sends a response to the status adapter 125, which is transformed as necessary and sent to the data object node processing runtime component 120 indicating that the action is not allowed to be performed, and the object node instance 120A, 120B or 120C processes the negative response by inhibiting the action from being performed. One example of inhibiting the action is to send an error message to the source that requested the action to be performed. Another example is to simply ignore the action request and continue on as if the action had never been requested. Yet another example is forwarding the negative response to another application for processing.

On the other hand, when the outcome of the determination specifies that the action is allowed, the status management runtime component 130 sends a response to the status adapter 125, which is transformed as necessary and sent to the data object node processing runtime component 120 indicating that the action is allowed to be performed, and the object node instance 120A, 120B or 120C processes the positive response. One example of processing a positive response is performing the action. Another example of processing the possible response is by forwarding the response to another application for processing.

Status variable value information associated with an object node instance may be previously stored in the status repository 140 or passed by the object node instance along with the check action request.

The status information also may be based on a status schema instance derived from a design-time model. The status schema instance may include relevant status variables and associated status values, actions and conditions modeled for corresponding object nodes and stored in the status repository 140. For example, at design-time, the status schema for an object node, may define constraints for actions by describing which actions are allowed for which status values, and define which status values may be or are set after the completion of the action. At runtime, a status schema instance may be loaded by the status management runtime 130 with the current values of the status variables for object node instances.

The data object processing runtime component 120 illustrates a service-based approach in which services are provided by object node instances 120A-120C to other computing entities over the network 145. Examples of the network 145 include the Internet, wide area networks (WANs), local area networks (LANs), or any other wired or wireless network. As illustrated in this example, services are offered to an online client system 145A and a mobile client system 145B, which each may be a general-purpose computer that is capable of operating as a client of the runtime processing component (such as a desktop personal computer, a workstation, or a laptop computer running an application program), or a more special-purpose computer (such as a device specifically programmed to operate as a client of a particular application program). For brevity, FIG. 1 illustrates only a single online client system 145A and a single mobile client system 145B. However, actual implementations may include many such computer systems.

The architecture of system 100 illustrates a service-oriented architecture, which defines objects and relationships of objects to provide services usable by other computing systems or components. The service-oriented architecture (or portions thereof) may be developed and licensed (or sold) by a commercial software developer. The service-oriented architecture 100 is one example of a computing environment in which the described principles, concepts and techniques may be implemented. The techniques apply to other architectures and system designs, as would be understood by a person skilled in the art. The service-oriented architecture is being described to illustrate an example to help articulate the described techniques.

In another example, the described techniques may be implemented in a software application or software components that are developed and licensed (or sold) by a commercial software developer. Examples of commercial software applications include customer relationship management or sales applications, supply chain management applications, financial management applications, or human resources management applications. The applications may work in conjunction with one or more other types of computer applications to form an integrated enterprise information technology (IT) solution for a business enterprise. In some architectures, for example, a service-oriented architecture, the described techniques may be implemented in data objects and as software service components.

When the system 100 of FIG. 1, object node programmers may need only to code calls to the status adapter, which enables communication to the status management runtime component 130 to make sure an action is allowed to be performed, instead of having to understand, identify and account for all constraints that are based on the status of an object node instance. The status adapter 125 may be said to decouple the data object processing runtime component 120 from the status management runtime component 130. This may increase efficiency of developing and implementing software systems. For example, an object node programmer need not necessarily know how to program the transformations required to communicate with the status management runtime component 130 from the data object processing runtime component 120. Rather, the object node programmer is able to access the functions provided by the status management runtime component 130 using, for example, the programming functions and data structure used by the data object node instances, which is likely to be well-understood by the object node programmer.

In addition, using a status adapter to decouple the data object processing runtime component 120 from the status management runtime component 130 helps to minimize the impact of changes made to the status management runtime component 130. For example, the status adapter 125 need only be changed to reflect a new interface (or changed interface) to the status management runtime component. The data object node instances generally would not need to be changed and could continue to function using the same calls to the status adapter 125 as used before a change was implemented in the status management runtime component. This may be referred to as centralizing changes in the status adapter.

Centralizing changes in the status adapter (rather than having to implement transformation changes in the data object node instances or another aspect of the data object runtime processing component 120) may improve the extensibility of status models and data structures of data object nodes. For example, to add a status variable to a data object node, the status adapter is updated with the mapping of the added status variable in the data object node to the corresponding status variable in the status management processing runtime component 130.

Including status information with the data object node instances in the data object processing runtime component 120 (as illustrated in data object node instance 120A having standard variables 121A, status variables 122A and actions 123A) may help to reduce runtime complexity. For example, the use of one buffer for data object node instances and status information is generally less complex and more efficient than the use of multiple buffers. In some implementations, the buffer for a data object node instance may be structured such that there is a data object node and a status node within the buffer. Additionally or alternatively, the buffer for a data object node instance may be structured such that there is an object node instance that includes both data object and status data.

The inclusion of status information (such as status values of status variables for data object node instances) in the data object processing runtime component 120 reduces the need to call the status management runtime component 130. For example, reading (or accessing) and saving a data object node instance may be performed by the data object processing runtime component 120 without the need to communicate with the status management runtime component 130.

Figure 3:
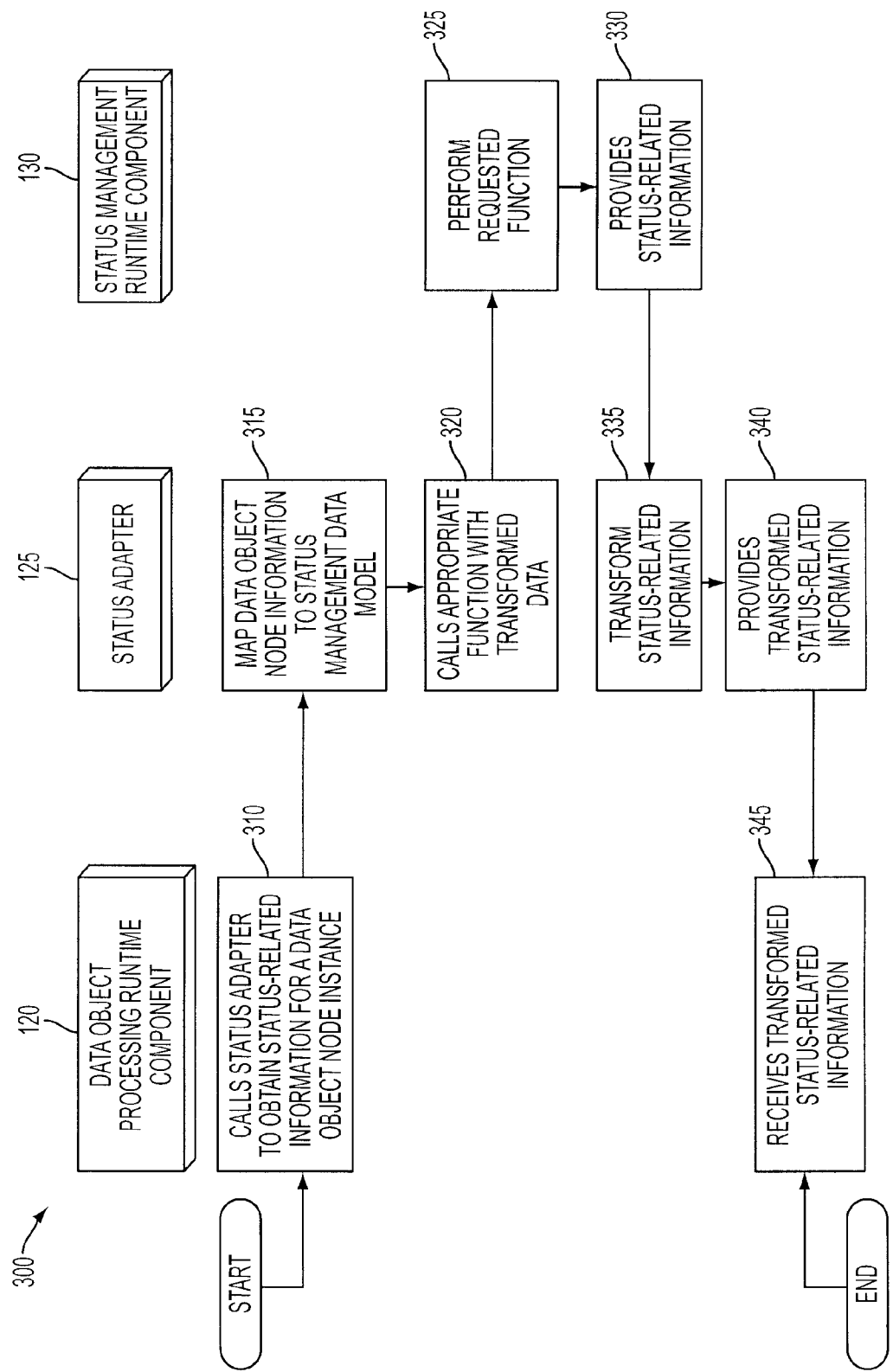

FIG. 3 is a flow chart of an example process 300 for facilitating communications between a data object processing framework and a status management component in a computer system. The process 300 is executed on an object-oriented implementation of the computer system 110 of FIG. 1. The process 300 involves the data object processing runtime component 120, the status adapter 125 and the status management runtime component 130. The status adapter 125 implements an interface between the data object processing runtime component 120 and the status management runtime component 130. In general, the data object processing runtime component 120 calls the status adapter 125 to use the status management runtime component 130, and the status management runtime component 130 returns status-related information to the data object processing runtime component 120 through the status adapter 125.

The process 300 begins when the data object processing runtime component 120 calls the status adapter for status-related information for a data object node instance (step 310). In one example, when an instance of a data object node is created, the data object processing runtime component 120 may call the status adapter 125 to obtain initial status variables for the data object node instance from the status management runtime component 130. In another example, the data object processing runtime component 120 may call the status adapter 125 for a determination by the status management runtime component 130 whether a particular action is allowed to be performed by a data object node instance. In yet another example, the data object processing runtime component 120 may call the status adapter 125 to obtain, from the status management runtime component 130, a status value to be set for a status variable of a particular data object node instance.

The status adapter 125 maps data object node information usable by the data object processing runtime component 120 to information usable by the status management runtime component 130 (step 315). For example, the status adapter 125 may access mapping information to transform status values for status variables to a different data model used by the status management runtime component 120.

The status adapter 125 calls an appropriate function of the status management runtime component 130 with transformed data (step 320). The status management runtime component 130 performs the request (step 325) and provides status-related information to the status adapter 125 (step 330). For example, if the status adapter 125 requested initial status variables for a newly created data object node instance, the status management runtime component 130 determines the initial values for the data object node instance, such as by accessing persistently stored status rules 140 of FIG. 1. In another example, if the status adapter 125 requested a determination whether a particular action is allowed to be performed by a data object node instance, the status management runtime component 130 determines whether the action is allowed to be performed based on the state of the data object node instance. To do so, the status management runtime component 130 may access status rules that, for example, identify required (or prohibited) status values of a status variable (or status variables) to perform the particular action. Based on a determination whether the data object node instance has the requisite status values, the status management runtime component 130 may indicate whether the action is allowed. In yet another example, if the status adapter 125 requested an indication of a status value to be set for a status variable of a particular data object node instance in response to performance of a particular action, the status management runtime component 120 may access status rules to determine a status value to be set for a status variable when a data object node instance performs the particular action. The status management runtime component 130 returns the requested status-related information to the status adapter 125 (step 330). The status management runtime component 120 provides status-related information according to the data model used by the status management runtime component 130.

The status adapter 125 transforms the status-related information received from the status management runtime component 130 to the data model used by the data object processing runtime component 120 (step 335) and provides the transformed status-related information (step 340) to the data object processing runtime component 120.

The data object processing runtime component 120 receives the transformed status-related information corresponding to the data object processing runtime component 120 call to the status adapter 125 (step 345). For example, the data object processing runtime component 120 may receive initial status values to be set for a newly created data object node instance. In another example, the data object processing runtime component 120 may receive an indication whether an action is permitted to be performed by a particular data object node instance based on the state of the data object node instance. In yet another example, the data object processing runtime component 120 may receive an indication as to a status value to be set for a status variable of a particular data object node instance.

As illustrated by the example process 300, the status adapter 125 facilitates the exchange of status-related information (e.g., indications of one or more status values to be set for status variable and a determination of whether an action is permitted to be performed by a particular data object node instance based on the state of the data object node instance). The status adapter 125 communicates with the status management runtime component 130 on behalf of the data object processing runtime component 120. The status adapter 125 communicates with the data object processing runtime component 120 on behalf of the status management runtime component 130. The status adapter 125 implements the interface between the data object processing runtime component 120 and the status management runtime component 130, which relieves the data object processing runtime component 120 from implementing an interface to the status management runtime component 130 and also relieves the status management runtime component 130 from implementing an interface to the data object processing runtime component 120.

Figure 4:
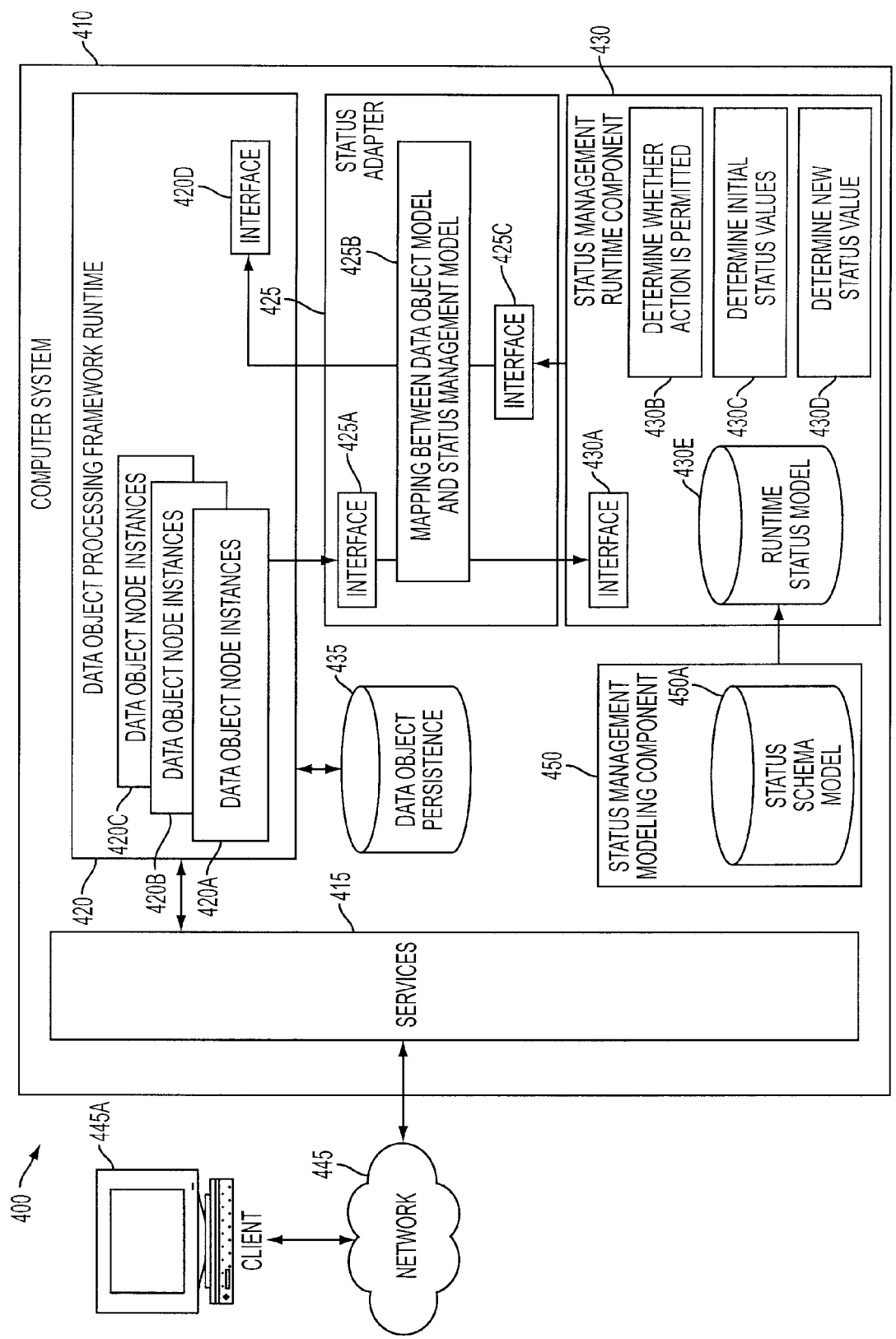

FIG. 4 is another example of a system 400 of networked computers that enable communication between a data object processing framework and a status management component. The system 400 includes a computer system 410 having a services component 415, a data object processing framework runtime component 420, a status adapter 425 and a status management runtime component 430. The computer system 410 also includes persistent storage 435 for data object node instances, which includes persistent storage for status information for the data object node instances. The computer system 410 also includes a status management modeling component 450.

In general, the status adapter 425 integrates the status information flow from the data object processing runtime component 420 to the status management runtime component 430 to define the behavior of data object node instances. The data object processing runtime component 420 (including the data object node instances) is used by the services component 415 to provide external services to client system 445A over the network 445. In the example of system 400, the status management runtime component 430 does not persist status information for data object node instances. Status information for data object node instances only is persisted through the data object processing runtime component 420.

More particularly, the data object processing runtime component 420 includes data object node instances 420A-420C, each of which include status variables. Each of the data object node instances 420A-420C is operable to execute actions defined for data object node to which the data object node instance relates. The data object processing runtime component 420 loads a data object node instance from the data object node persistent storage 435 into a buffer in the memory of the computer system 420. The data object processing runtime component 420 also includes an interface 420D accessible to the status adapter 425.

The status adapter 425 includes an interface 425A accessible by the data object processing runtime component 420. The status adapter 425 also includes instructions 425B that, when executed, are operable to perform mapping between the data object model used by the data object processing runtime component 420 and the status management model used by the status management runtime component 430 at runtime. The status adapter 425 also includes an interface 425C accessible by the status management runtime component 430.

The status management runtime component 430 includes an interface 430A accessible to the status adapter 425. The status management runtime component 430 also includes instructions 430B that, when executed, are operable to determine whether an action is permitted to be performed on, or by, a particular data object node instance based on status information related to the data object node instance. The status management runtime component 430 also includes instructions 430C that, when executed, are operable to determine initial status values for a data object node instance and instructions 430D that, when executed, are operable to determine a new status value for a data object node instance. The status management runtime component 430 also includes a runtime status model component 430E that is used by the instructions 430B-430D to determine status-related information for a data object node instance.

The computer system 410 also includes a status modeling component 450 capable of generating and presenting on a display device (or devices) a modeling user interface for defining status schema models 450A for data object nodes. In general, once the status schema models 450A have been defined in the status modeling component 450, the status schema models 450A are transformed into a format usable by the status management runtime component 430 and stored in the runtime status model component 430E.

More particularly, the status modeling component 450 enables a user at design-time to define a status schema model for a data object node. Each status schema model includes status variables (and for each status variable, a set of predefined permissible values), actions, and preconditions that determine whether an action is permitted to be performed by a data object node instance corresponding to the data object node to which the status schema model corresponds. An action generally represents a process step that can be performed on an instance of a data object node for which the status schema model corresponds. A precondition generally relates an action with a status value of one of the status variables, and may enable or inhibit an action. At runtime, the status management runtime component 430 evaluates preconditions of an action to determine whether the action is permitted to be performed on or by the data object node instance. Some status schema models include a status transition, which represents a status value of a status variable that is set when a particular action is performed on a data object node instance corresponding to the status schema model of the data object node.

In one example operation of system 400, a user of client 445A accesses, over the network 445, services 415 provided by the computer system 410. For example, the user may interact with a graphical user interface related to sales that is provided by services 415. The user may indicate a sales order (represented by an instance of a sales order node) is to be approved. The services 415 passes the approval request indication to the data object processing runtime component 420 and the data object node instance 420A (representing the sales order node instance). Before performing the indicated approval action, the sales order node instance calls the status adapter 425 interface 425A to check to see if an approval action (requested by the user) is permitted to be performed on the sales order node instance. The status adapter 425 maps the relevant data from the sales order node instance to a form usable by the status management runtime component 430. For example, the status adapter 425 maps the current status value of an approval variable of the sales order node instance and the indication of the action to be performed (here, the approval action) to corresponding data used in the status management runtime component 430.

The status adapter 425 calls the status management runtime component interface 430A operable to execute the instructions 430B to determine whether the action is permitted. The status management runtime component 430 executes the instructions and uses the status runtime model for the sales order node to determine whether the approval action is permitted based on the current status value of an approval status variable of the sales order object node instance. To obtain the current status values, the status management processing runtime component 430 calls the status adapter 425 through the interface 425C. The status adapter 425 performs the necessary status mapping and the calls the data object processing runtime component 420 through the interface 420D. The status values are returned to the status adapter 425, which maps the status values and provides the mapped status values to the status management processing runtime component 430.

When the approval action is permitted to be performed, the status management runtime component 430 also executes the instructions 430D to determine a new status value that is to be set based on performance of the approval action. To do so, the status management runtime component 430 uses the status runtime model for the sales order node to determine the status value to be set based on performance of the approval action. Also, after the action is executed, status derivations, such as determining a depending status value, may be calculated and saved to the data object buffer 522.

In this example, the status management runtime component 430 returns an indication that the action is permitted and the status value of a different data object node instance (such as the instance having the depending status value) to be set through the interface 425C of the status adapter 425. The status adapter 425 maps the indication and the status value to be set to a form usable by the data object processing runtime component 420 and returns the transformed indication to the interface 430D of the status management runtime component 430. The sales order object node instance performs the action and sets the status value based on performance of the approval action.

Figure 5:
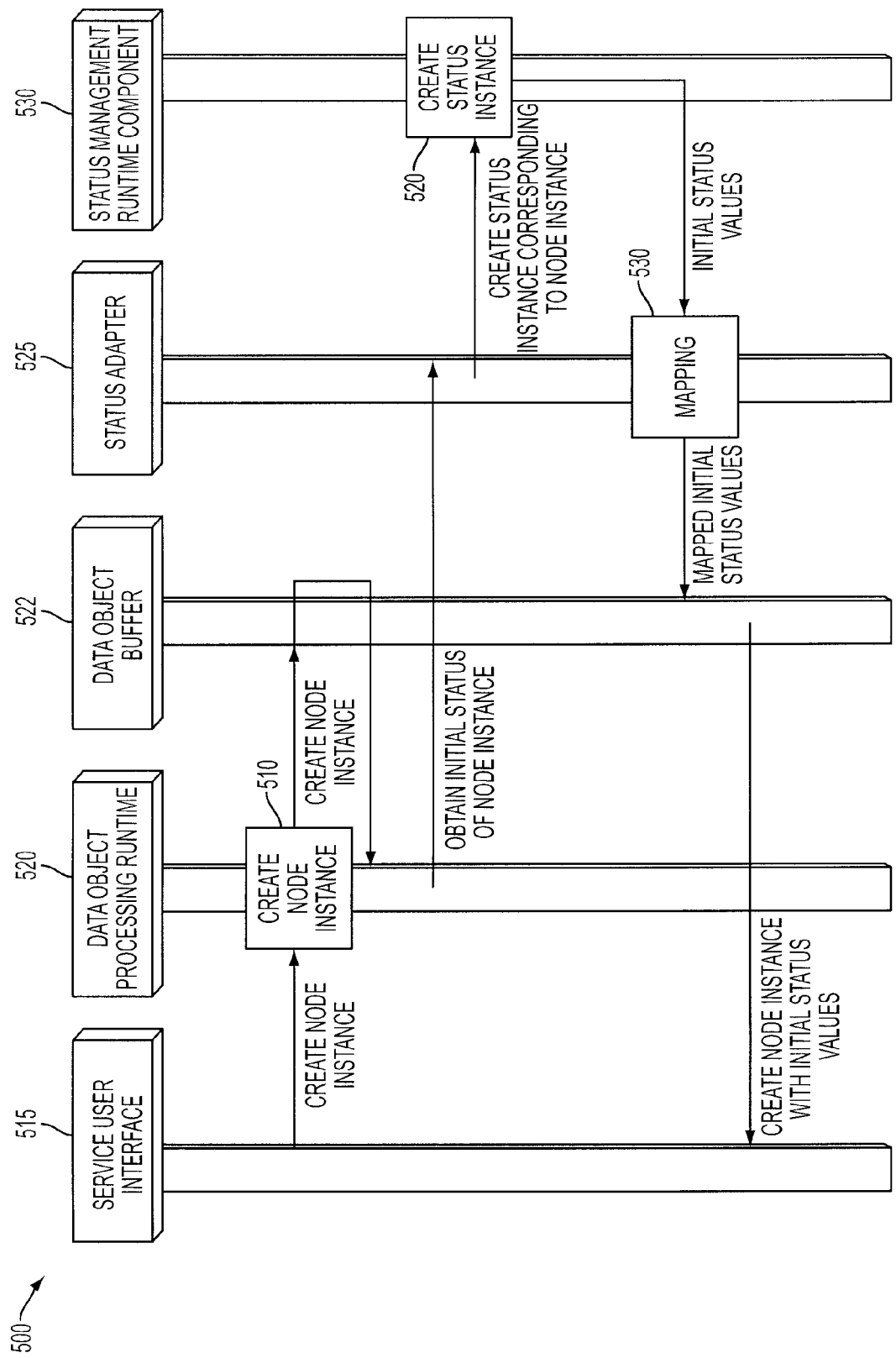

FIG. 5 is a flow chart of an example process 500 for facilitating communications between a data object processing framework and a status management component in a computer system. In particular, the process 500 facilitates communications related to creating an object node instance. The process 500 is executed on an object-oriented implementation of the computer system 410 of FIG. 4. The process 500 involves a service user interface 515, a data object processing runtime component 520, a data object buffer 522, a status adapter 525 and a status management runtime component 530.

In general, the service user interface 515 provides a graphical user interface accessible to users, and the data object processing runtime component 520 provides processing services based on instructions received through the graphical user interface. A data object buffer 522 stores data object node instances being processed using the data object processing runtime component 520. A data object node instance includes status variables and other variables for the data object node instance (which may be referred to as business data, business values or business variables). The status adapter 525 implements an interface to the status management runtime component 530.

The process 500 begins with an instruction from the service user interface 515 to create a data object node instance. Based on that instruction, the data object processing runtime component 520 creates the data object node instance with business data (step 510), which is stored in the data object buffer 522. The data object processing runtime component 520 calls the status adapter 525 to obtain initial status values to be set in the created data object node instance. The status adapter 525 calls the status management processing runtime component 530, which creates a status instance corresponding to the data object node instance (step 520). The created status instance includes initial status values. The initial status values for the created status instance may be based, for example, on business logic or other types of rules or a runtime status schema model. The status management processing runtime component 530 returns to the status adapter 525 the initial status values. This may be accomplished, for example, by the status management processing runtime component 530 placing the created status instance which includes the initial status values into a buffer accessible to the status adapter 525.

The status adapter 525 maps the received initial status values to a form usable by the data object processing runtime component 520 (step 530) and saves the mapped initial status values in the data object node instance in the data object buffer 522. The data object processing runtime component 520 provides the created data object node instance, including the initial status values, to the service user interface 515. This may be accomplished, for example, by the status adapter 525 filling the status variable of the data node instance in the data object buffer 522 with the mapped status values.

In the example of process 500, the data object buffer 522 includes a single data structure for a data object node instance. The single data structure includes status variables and other variables of the data object node instance. In some implementations, the data object buffer 522 may include multiple data structures for a data object node instance. For example, there may be one data structure for the data object node variables and another data structure that includes the status values for the data object node instance and a relationship to the data object node instance. In such a case, for example, the data object processing runtime component 520 merges the data object node with the status node for the data object node instance before providing the data object node instance to the service user interface 515.

As illustrated by the process 500, a create service is provided by the data object processing runtime component 520 to the service user interface 515. The create service is executed for a data object node instance that includes status variables, and the status adapter 525 triggers the creation of the corresponding status instance in the status management processing runtime component 530, maps the initial status values from the form of the status management processing runtime component 530 to the form of the data object processing runtime component 520, and places the data object node instance in the data object buffer 522. As such, there is no implementation effort for the data object nodes or service user interface to access and use the status management processing runtime component 530.

Referring to FIG. 6A, an example process 600A for retrieving a data object node instance from memory is illustrated. The process 600A, like the process 500 of FIG. 5, is described with respect to a data object buffer 522 that stores a data object node instance using a single data structure for the status variables and the business variables for the data object node instance.

The process 600A, like the process 500 for a create service, begins with an instruction from the service user interface 515, the instruction in process 600A is an instruction to retrieve a data object node instance. Based on that instruction, the data object processing runtime component 520 retrieves the data object node instance from the data object buffer 522 (step 610A). The data object node instance is provided to the service user interface 515.

As illustrated by the process 600A, a retrieve service is provided by the data object processing runtime component 520 to the service user interface 515. The retrieve service executed for a data object node instance that includes status variables, and the data object processing runtime component 520 reads both the data node and the status node (including the status data for the data object node instance) directly from the data object buffer 522. The data object processing runtime component 520 does not access the status management processing runtime component 530 and no mapping is necessary by the status adapter 525. The retrieve service illustrated in the process 600A may be more efficient than other processes that access multiple buffers or a status management processing runtime component 530 to retrieve status information for a data object node instance. Also, as illustrated, for the retrieve process 600A, no implementation effort is needed for the data object nodes or service user interface with regard to using the status management processing runtime component 530.

Referring to FIG. 6B, an example process 600B for retrieving a data object node instance from memory is illustrated. In contrast with the process 600A of FIG. 6A, the process 600B is described with respect to a data object buffer 522 that stores a data object node instance using one data structure for the status variables for the data object node instance and another data structure for the other status variables for the data object node instance. The data structures may be referred to as a status node and a data node, respectively.

The process 600B begins with an instruction from the service user interface 515, the instruction in process 600B is an instruction to retrieve a data object node instance. Based on that instruction, the data object processing runtime component 520 retrieves the data node for the data object node instance from the data object buffer 522 (step 610B) and retrieves the status node for the data object node instance from data object buffer 522 (step 620B). The data node and the status node are merged (step 630B) and the data object node instance is provided to the service user interface 515.

As illustrated by the process 600B, a retrieve service is provided by the data object processing runtime component 520 to the service user interface 515. The retrieve service executed for a data object node instance that includes status variables, and the data object processing runtime component 520 reads both the data node and the status node (including the status data for the data object node instance) directly from the data object buffer 522. The data object processing runtime component 520 does not access the status management processing runtime component 530 and no mapping is necessary by the status adapter 525. The retrieve service illustrated in the process 600B may be more efficient than other processes that access multiple buffers or a status management processing runtime component 530 to retrieve status information for a data object node instance. Also, as illustrated, for the retrieve process 600B, no implementation effort is needed for the data object nodes or service user interface with regard to using the status management processing runtime component 530.

Figure 7A:
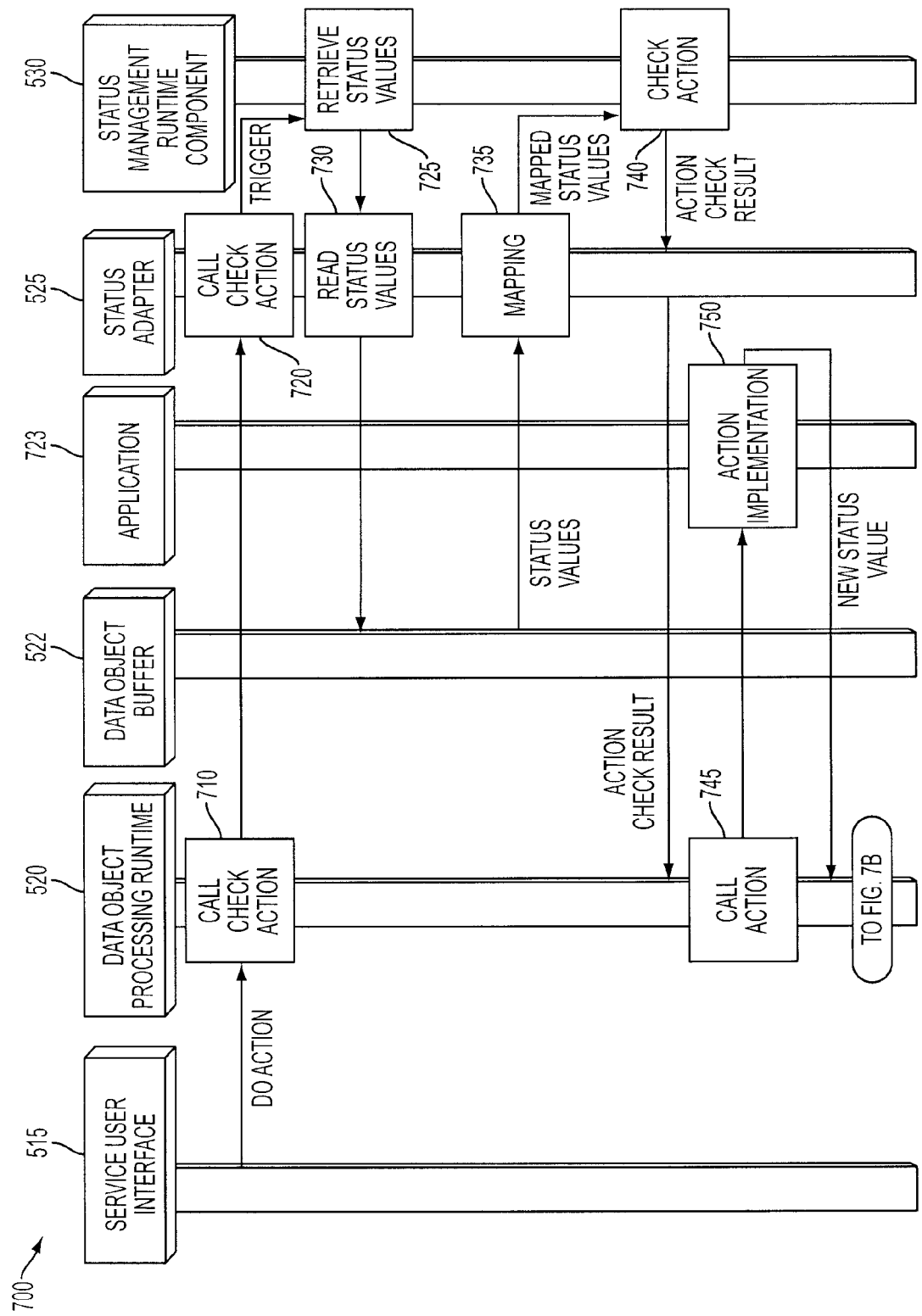
Figure 7B:
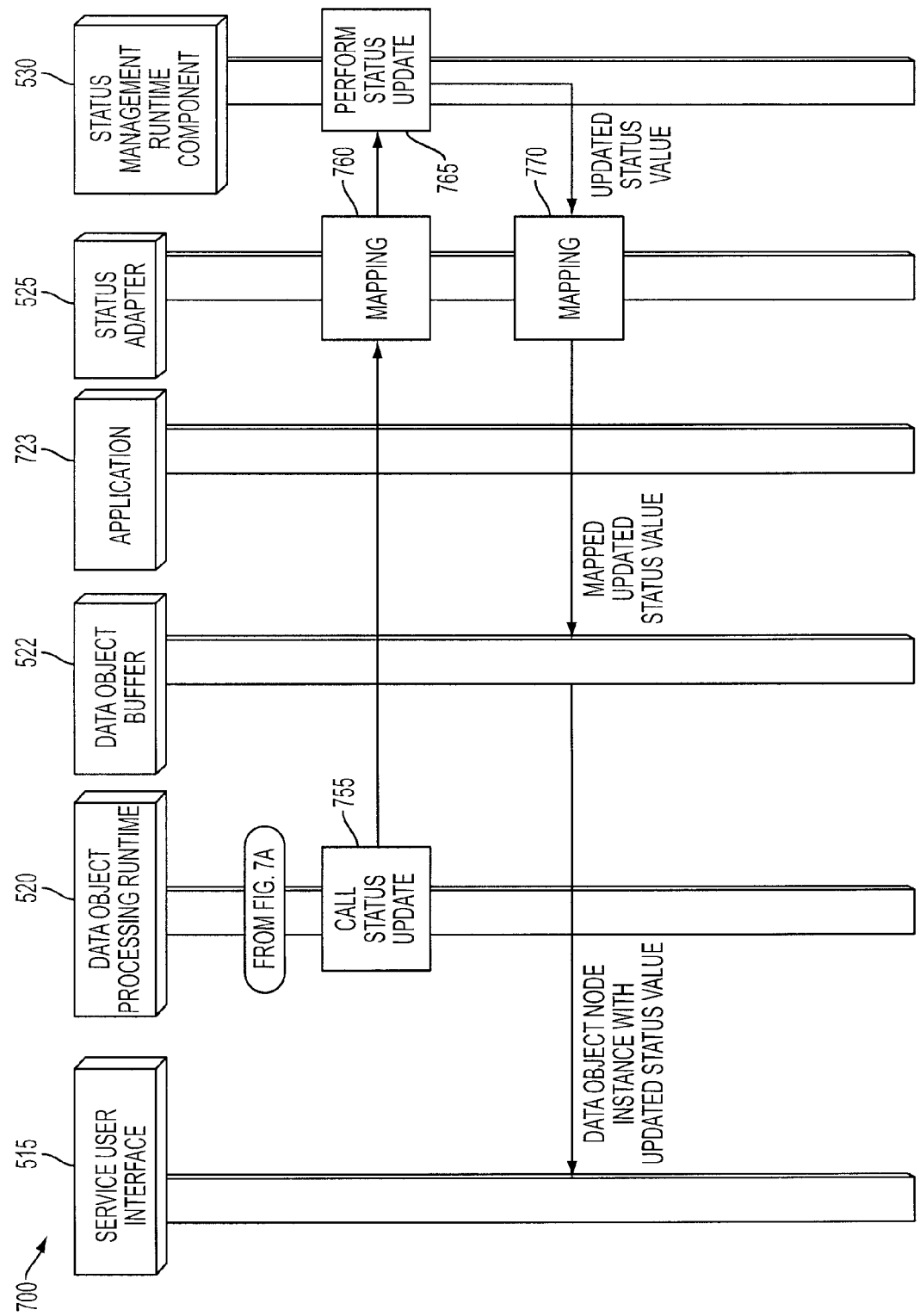

Referring to FIGS. 7A and 7B, an example process 700 is illustrated for executing an action and facilitating communications between a data object processing framework and a status management component. The process 700, like the process 500 of FIG. 5 and the process 600A of FIG. 6A, is described with respect a data object buffer 522 that stores a data object node instance using a single data structure for the status variables and the business variables for the data object node instance.

The process 700 begins with an instruction from the service user interface 515 to perform an action. Based on that instruction, data object processing runtime component 520 calls the status adapter 525 to check whether the action is allowed to be performed and whether the status value may be updated (step 710). The status adapter 525 calls the status management processing runtime component 530 to trigger checking whether the action is permitted (step 720).

The status management processing runtime component 530 retrieves status values from the status variables of the data object node instance in the data object buffer 522 (step 725). To do so, the status management processing runtime component 530 calls the status adapter 525 to retrieve the status values.

The status adapter 525 reads the status values of the status variables in the data object node instance from the data object buffer 522 (step 730). In some implementations or in some contexts, the status adapter 525 may map or otherwise translate or transform the request from the status management processing runtime component 530 to a form that can be used to read the status variables from the data object buffer 522.

The status adapter 525 maps the read status values to a form usable by the status management processing runtime component 530 (step 735) and provides the mapped status values to the status management processing runtime component 530.

The status management processing runtime component 530 checks whether the action is permitted (step 740). The determination of whether the action is permitted is based on the retrieved status values of the data object node instance. The status management processing runtime component 530 provides the result of the determination whether the action is permitted (here, called "action check result") to the status adapter 525, which, in turn, provides the result to the data object processing runtime component 520. In some implementations, the status adapter 525 may transform the result from the form received from the status management processing runtime component 530 to a form usable by the data object processing runtime component 520. In the example of process 700 shown in FIGS. 7A and 7B, the status management processing runtime component 530 made a determination that the action is permitted to be performed.

The data object processing runtime component 520 calls an application that implements the action (step 745). The application 723 performs the action, which results in a new status value for a status variable of the data object node instance on which the action was performed (step 750). The application 723 provides the new status value to the data object processing runtime component 520.

Referring also to FIG. 7B, the data object processing runtime component 520, in turn, calls the status adapter 525 to update the status value provided by the application 723 (step 755). The status adapter 525 maps the status value provided by the data object processing runtime component 520 to a form usable by the status management processing runtime component 530 (step 760) and calls the status update function of the status management processing runtime component 530.

The status management processing runtime component 530 updates the status value (step 765). As part of the status update, the status management processing runtime component 530 checks to determine whether the status transition to the new status value is permitted as a result of the action being performed. The status management processing runtime component 530 also may update additional status values. For example, the status management processing runtime component 530 may update status variables that depend on the status value provided by the status adapter 525. In a more particular example, the status management processing runtime component 530 may update status values of status variable in child nodes when a status value of a status variable in a parent node is updated. The status management processing runtime component 530 provides updated status value or values to the status adapter 525.

The status adapter 525 maps the updated status value from the form received by the status management processing runtime component 530 to a form usable by the data object processing runtime component 520 (step 770). The status adapter 525 provides the mapped, updated status value to the data object buffer 522. The data object processing runtime component 520 makes the object node instance updated with the new status value.

As illustrated in this example, the application 723 determines a status value that results from the action. Before the data object node instance is updated with the status value, the status management processing runtime component 530 determines that the action is permitted to result in the status value. When the status value determined by the application 723 has been verified as a permitted status transition, the data object buffer 522 is updated with the new status value. The status adapter 525 handles the interface between the data object processing runtime framework (which includes the data object processing runtime component 520 and the data object buffer 522) and the status management processing runtime component 530.

As illustrated by the process 700, the status adapter 525 triggers the status change in the status management processing runtime component 530, maps the new status values from the form of the status management processing runtime component 530 to the form of the data object processing runtime component 520, and places the changed status data in data object node instance in the data object buffer 522. The application 723 merely defines the new status values in the business logic of the action implementation. The application 723 does not need to implement an interface to the status adapter 525 or the status management processing runtime component 530.

Referring to FIG. 8, an example process 800 for saving a data object node instance to memory is illustrated. The process 800, like the process 500 of FIG. 5, the process 600A of FIG. 6A and the process 700 of FIGS. 7A and 7B, is described with respect to a data object buffer 522 that stores a data object node instance using a single data structure for the status variables and the business variables for the data object node instance.

The process 800 begins with an instruction from the service user interface 515 to save a data object node instance. Based on that instruction, the data object processing runtime component 520 saves the data node for the data object node instance to the data object buffer 522 (step 810). The changed data in the data object node instance is persistently stored, for example, in a database table. The same database table may be used for the data node and status node of the data object node instance.

As illustrated by the process 800, a save service is provided by the data object processing runtime component 520 to the service user interface 515. The save service that is executed for a data object node instance that includes status variables saves the data object node instance to the data object buffer 522. The data object processing runtime component 520 does not access the status management processing runtime component 530 and no mapping is necessary by the status adapter 525. The save service illustrated in the process 800 may be more efficient than other processes that use multiple buffers or a status management processing runtime component 530 to save status information for a data object node instance. Also, as illustrated, for the save process 800, no implementation effort is needed for the data object nodes or service user interface with regard to using the status management processing runtime component 530.

Figure 9:
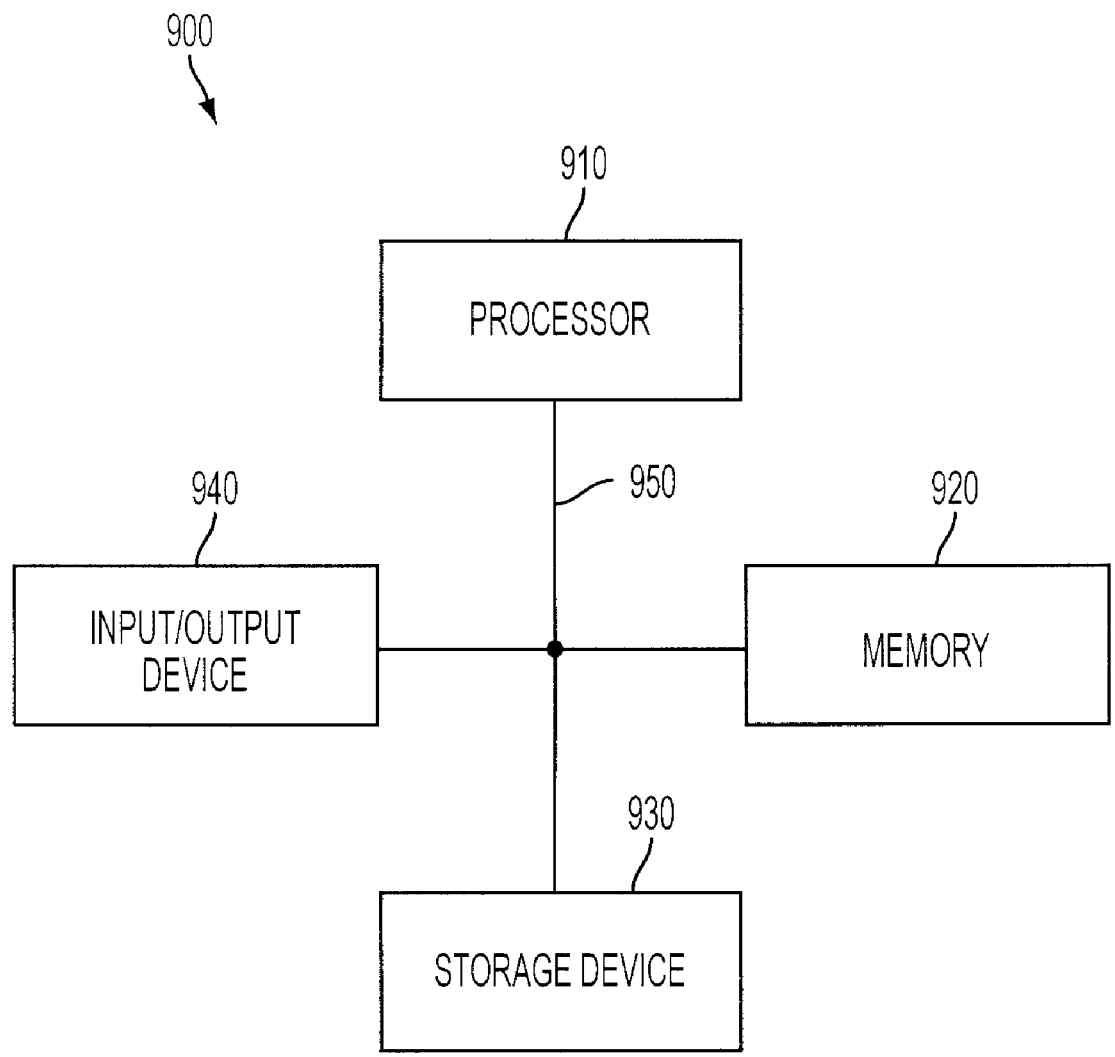
FIG. 9 is a block diagram of a computer system.

FIG. 9 is a block diagram of a computer system 900 that can be used in the operations described above, according to one implementation. The system 900 includes a processor 910, a memory 920, a storage device 930 and an input/output device 940. Each of the components 910, 920, 930 and 940 are interconnected using a system bus 950. The processor 910 is capable of processing instructions for execution within the system 900. In some implementations, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In another implementation, the memory 920 is a volatile memory unit. In still another embodiment, the memory 920 is a non-volatile memory unit.

The storage device 930 is capable of providing mass storage for the system 900. In one embodiment, the storage device 930 is a computer-readable medium. In various different embodiments, the storage device 930 may be a floppy disk device, a hard disk device, an optical disk device, or a tape device.

For example, the data object processing runtime component 120 discussed previously with respect to FIGS. 1 and 4 may include the processor 910 executing computer instructions that are stored in one of memory 920 and storage device 930. In another example, an implementation of the status management modeling component 450 described above with respect to FIG. 4 may include the computer system 900.

The input/output device 940 provides input/output operations for the system 900. In one implementation, the input/output device 940 includes a keyboard and/or pointing device. In another implementation, the input/output device 940 includes a display unit for displaying graphical user interface as discussed above.

The techniques can implemented in a distributed manner. For example, the functions of the input/output device 940 may be performed by one or more computing systems, and the functions of the processor 910 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, or in computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

The techniques can be implemented in a distributed manner. For example, the functions of the input/output device 940 may be performed by one or more computing systems, and the functions of the processor 910 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in non-transitory computer-readable storage medium for enabling communication with a status management component of a computer system, the computer program product comprising instructions stored in the computer-readable storage medium and that, when executed, perform operations comprising providing a status adapter to a processing runtime environment for use in accessing a status management runtime environment, wherein:
  the processing runtime environment includes multiple systems, wherein status variables and action indicators are different in at least some of the systems;
  the processing runtime environment includes data object node instances resident in computer memory and enables access to persistent storage for the data object node instances, each data object node instance including values for variables and actions capable of being performed by the data object node instance;
  the status management runtime environment is configured to provide status-related information and has defined therein one or more status variables and one or more action indicators, both different from those in the processing runtime environment; and
  the status adapter is configured to
  a) receive a first request, from the processing runtime environment, indicating an action to be performed on a data object node instance;
  b) use a translation table to translate object information for the data object node instance, that is usable by the processing runtime component, to a first information that is usable by the status management runtime environment;
  c) send a second request, to the status management runtime environment, to determine whether the action is allowed to be performed on the data object node instance, where the second request includes the first information;
  d) receive a third request, from the status management runtime environment, to read at least one current status value of one or more status variables for the data object node instance;
  e) translate the third request to a form that can be used to read the status variables;
  f) read the at least one current status value using the translated third request;
  g) use the translation table to translate the read at least one current status value to a form usable by the status management runtime environment;
  h) provide the translated at least one current status value to the status management runtime environment;
  i) receive, from the status management runtime environment, an indication of whether the action is allowed to be performed on the data object node instance;
  j) use the translation table to translate the indication to a form that is usable by the processing runtime environment;
  k) provide the translated indication to the processing runtime environment;
  l) receive a fourth request, from the processing runtime environment, to update a first status variable of the data object node instance to a new status value in response to the action being performed on the data object node instance;
  m) use the translation table to translate the new status value to a form usable by the status management runtime environment;
  n) send a fifth request, to the status management runtime environment, to determine one or more appropriate status updates to perform, based on the new status value, the fifth request including the translated new status value;
  o) receive, from the status management runtime environment, one or more status values to update, where at least one of the status values to update corresponds to the first status variable;
  p) use the translation table to translate the one or more status values to a form usable by a data object buffer; and
  q) provide, to the data object buffer, the one or more translated status values.

2. The computer program product of claim 1 wherein the status adaptor is configured to
  a) receive a request from the processing runtime environment to obtain initial status values for one or more status variables of the data object node instance;
  b) send a request to the status management runtime environment to create a status instance associated with the data object node instance, the status instance including initial status values for the data object node instance;
  c) receive the initial status values from the status management runtime environment;
  d) use the translation table to translate the initial status values to translated initial status values usable by the processing runtime environment; and
  e) save the translated initial status values in the data object buffer.

3. The computer program product of claim 1 wherein:
  the one or more status values to update include includes a set of status values,
  the set of status values includes a first status value for the first status variable to be set in the data object node instance and a second status value for a second status variable to be set in a second data object node instance, and
  the second data object node instance is a child node of the data object node instance.

4. The computer program product of claim 1 wherein the status adapter is configured to transform a user-defined status value received from the status management runtime environment to a corresponding status value usable by the processing runtime environment.

5. A computer-implemented method for enabling communication with a status management component of a computer system, the method comprising providing a status adapter to a processing runtime environment for use in accessing a status management runtime environment, wherein:
  the processing runtime environment includes multiple systems, wherein status variables and action indicators are different in at least some of the systems;
  the processing runtime environment includes data object node instances resident in computer memory and enables access to persistent storage for the data object node instances, each data object node instance including values for variables and actions capable of being performed by the data object node instance;
  the status management runtime environment provides status-related information and has defined therein one or more status variables and one or more action indicators, both different from those in the processing runtime environment; and
  the status adapter
  a) receives a first request, from the processing runtime environment, indicating an action to be performed on a data object node instance;
  b) uses a translation table to translate object information for the data object node instance, that is usable by the processing runtime component, to a first information that is usable by the status management runtime environment;
  c) sends a second request, to the status management runtime environment, to determine whether the action is allowed to be performed on the data object node instance, where the second request includes the first information;

d) receives a third request, from the status management runtime environment, to read at least one current status value of one or more status variables for the data object node instance;

e) translates the third request to a form that can be used to read the status variables;

f) reads the at least one current status value using the translated third request g) uses the translation table to translate the read at least one current status value to a form usable by the status management runtime environment h) provides the translated at least one current status value to the status management runtime environment i) receives, from the status management runtime environment, an indication of whether the action is allowed to be performed on the data object node instance;

j) uses the translation table to translate the indication to a form that is usable by the processing runtime environment k) provides the translated indication to the processing runtime environment l) receives a fourth request, from the processing runtime environment, to update a first status variable of the data object node instance to a new status value in response to the action being performed on the data object node instance;

m) uses the translation table to translate the new status value to a form usable by the status management runtime environment n) sends a fifth request, to the status management runtime environment, to determine one or more appropriate status updates to perform, based on the new status value, the fifth request including the translated new status value;

o) receives, from the status management runtime environment, one or more status values to update, where at least one of the status values to update corresponds to the first status variable;

p) uses the translation table to translate the one or more status values to a form usable by a data object buffer; and q) provides, to the data object buffer, the one or more translated status values.

6. The method of claim 5 wherein the status adaptor a) receives a request from the processing runtime environment to obtain initial status values for one or more status variables of the data object node instance;

b) sends a request to the status management runtime environment to create a status instance associated with the data object node instance, the status instance including initial status values for the data object node instance;

c) receives the initial status values from the status management runtime environment;

d) uses the translation table to translate the initial status values to translated initial status values usable by the processing runtime environment; and e) saves the translated initial status values in the data object buffer.

7. The method of claim 5 wherein:

the one or more status values to update includes a set of status values, the set of status values includes a first status value for first status variable to be set in the data object node instance and a second status value for a second status variable to be set in a second data object node instance, and the second data object node instance is a child node of the data object node instance.

8. The method of claim 5 wherein the status adapter transforms a user-defined status value received from the status management runtime environment to a corresponding status value usable by the processing runtime environment.

* * * * *